T. E. MULROYAN.
TILTING GATE.
APPLICATION FILED JUNE 28, 1915.
1,181,335.
Patented May 2, 1916.
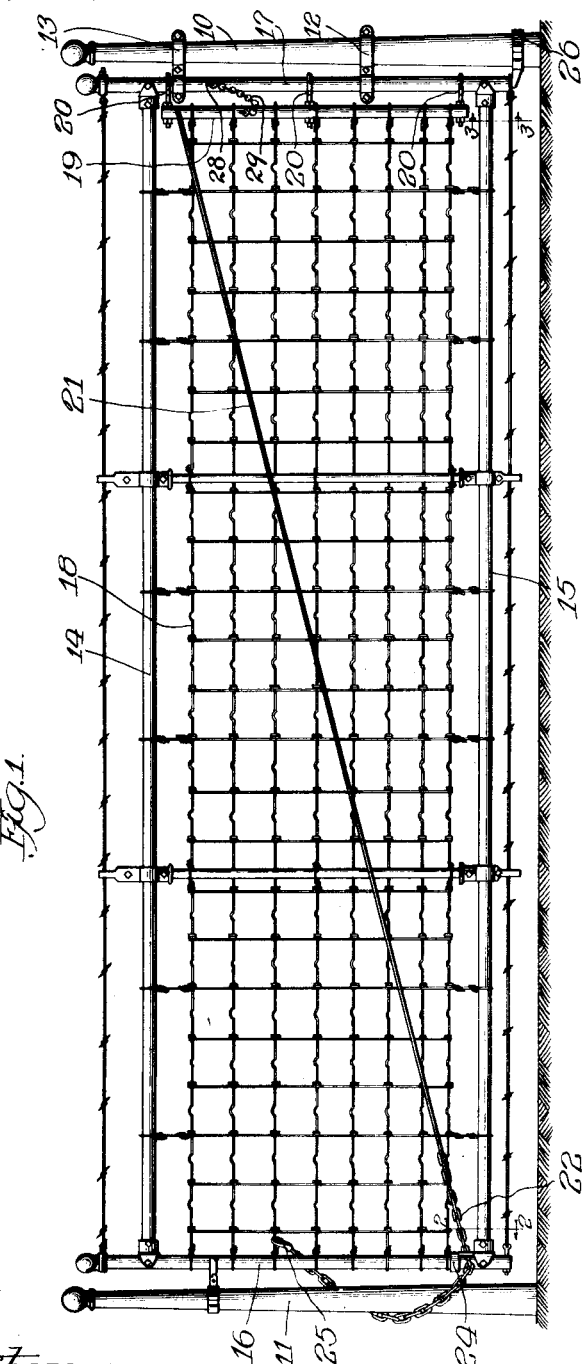

UNITED STATES PATENT OFFICE.

THOMAS E. MULROYAN, OF DE KALB, ILLINOIS, ASSIGNOR TO THE AMERICAN STEEL & WIRE COMPANY OF NEW JERSEY, OF HOBOKEN, NEW JERSEY, A CORPORATION OF NEW JERSEY.

TILTING GATE.

1,181,335. Specification of Letters Patent. Patented May 2, 1916.

Application filed June 28, 1915. Serial No. 36,727.

*To all whom it may concern:*

Be it known that I, THOMAS E. MULROYAN, a citizen of the United States, and resident of De Kalb, in the county of Dekalb and State of Illinois, have invented certain new and useful Improvements in Tilting Gates, of which the following is a specification.

My invention relates to gates and has particular reference to a novel tilting gate.

I am aware that many forms of tilting gates have heretofore been devised and an object in the construction of the present device is to overcome certain difficulties which were found in some or all of those structures.

An object in the present construction is to provide a tilting gate of the parallel motion type, in which the gate frame is composed of two longitudinal and two vertical members hinged at their ends, one of the end members being pivoted to the post and means being provided for holding the gate in its horizontal and different adjusted positions.

The present improvement relates first to the means for adjusting and holding the gate in its horizontal and tilted positions and contemplates the employment of a diagonal member which is secured to the frame at an upper corner near the pivot post and at the extreme lower corner at the free end of the gate.

The invention further contemplates the employment of means for supporting the gate at its end near the pivot post and for simultaneously relieving the vertical member of the gate at the point near the pivot post from excessive strains.

The invention will be more clearly understood by reference to the accompanying drawings, wherein, Figure 1 is an elevation of a gate constructed in accordance with my invention; Fig. 2 is an enlarged section on the line 2—2 of Fig. 1, and, Fig. 3 is an enlarged section on the line 3—3 of Fig. 1.

As shown in the drawings it will be seen that I employ two posts 10, 11, the former of which is the one to which the gate is pivoted by means of the straps or hinges 12, 13. The gate may include upper and lower horizontal members 14, 15, respectively, and vertical members 16, 17. The vertical and horizontal members are hinged together at their ends to form a frame which in the horizontal position of the gate is rectangular. A fabric 18, may be utilized to fill the spaces within the frame, this fabric being secured at one end to the vertical member 16, and at the other end to an auxiliary vertical post 19, which is secured to the vertical member 17, by means of the eye-bolts 20. It will be understood that the frame as so constructed would not normally remain in the position shown in Fig. 1, the tendency being for the free end of the gate to rest on the ground. As a means for maintaining the gate in a horizontal position and for securing it in its different vertically adjusted positions, I provide the rod 21, secured near the upper end of the frame to the auxiliary vertical member 19, extending diagonally to the lower free end of the gate where the rod terminates in a chain 22, which passes through an aperture 23, in a bracket 24, secured to the vertical member 16. The aperture 23, has a contracted portion within which one of the links of the chain 22, is fitted, as best shown in Fig. 2, the larger portion of the aperture 23, permitting the chain to pass therethrough without obstruction. The free end of the chain 22, may be provided with a hook 25, which is shown as engaging one of the wires of the fabric 18, after having been passed around the post 11.

A particular object in the present construction is to locate the fastening device for the diagonal member at a point substantially at the junction of the vertical and horizontal members. It will be understood that these gates are of considerable weight and that considerable strain is imposed upon the diagonal holding member. This is accentuated in service when persons try to climb over the gate or because of interference therewith by farm animals. It has been found that if the attaching means for the diagonal member is located intermediate the ends of the vertical member 16, this member is frequently bent or broken. A further object in the construction shown is to provide such a fastening for the chain as will permit of engagement with the chain on a lifting movement of the gate. In practice the user grasps the chain and lifts thereon thus lifting the gate and securing it simultaneously. It will be likewise understood that there is a severe bending strain on the vertical member 17, of the frame, due to the thrust of the horizontal members, and such tendency is overcome in the present construction by providing a support and pivot for the end member at the lower extremity thereof. This consists in a band 26, which carries a bracket having an upwardly projecting stud 27, adapted to enter the lower end of the tubular member 17, as best shown in Fig. 3. By the use of this construction the dead weight of the gate is carried and the thrust of the lower horizontal member 17, of the frame is transmitted directly to the post near the ground. The fact that the frame is connected to the pivoted post by the upper strap 13, near the top horizontal member provides for the pull exerted by such top member.

The gate shown is of the type which is capable of limited, bodily vertical movement in addition to its capability of tilting movement. The end member 17 of the gate is adapted to be slid vertically through the hinge members 12, 13, and to be held in vertically adjusted position by means of the pin 28 attached to the chain 29. After the gate has been elevated to the desired extent, the pin 28 having first been removed from the position shown, the pin is reinserted in one of a plurality of openings in the end member 17 at a point above the hinge 13. It will be noted that in view of the fact that the gate is to be bodily moved vertically, the hinge member 12 must be located at such a distance above the lower bar 15, or the eye-bolt 20, as will permit of such vertical movement. Therefore, such hinge member can furnish but slight support for the thrust of the lower frame member 15. It is for this reason that I provide the pintle, or dowel, on the bracket 26 and adapted to engage the hollow lower end of the end member 17. When the gate is raised, the end member is out of engagement with the pivot, or dowel, and the thrust is taken by the hinge member 12. However, when the gate is lowered and is in the position shown in the drawings, the end member is in engagement with the pivot and the thrust is taken thereby.

The construction shown has been found to be efficient in service and lends itself to ready adaptation to this form of gate. Obviously modifications might be made therein and such modifications as are within the scope of my claims I consider within the spirit of my invention.

I claim:

1. In a tilting gate, the combination of vertical and horizontal members hinged at their ends to form a frame, a tension member extending between the diagonal corners of said frame, said tension member terminating in a chain, a bracket secured to said frame, substantially at the free lower end thereof, said bracket being provided with an opening which is vertically contracted, the larger part of said opening allowing said chain to pass freely therethrough, the smaller portion of said opening accommodating a link of said chain in one position only, substantially as described.

2. In a gate, the combination of frame members hinged at their ends, a diagonal brace for maintaining said frame in adjusted position, post hinges engaging an end member of said frame, the lower of said post hinges being located at such a point above the lower frame member as will permit of limited bodily vertical movement of said gate, said end member having a hollow lower end, and a vertical stud carried by a bracket and adapted to engage the open lower end of said end member only when said gate is in its lowermost position, substantially as described.

3. In a gate, the combination of frame members hinged at their ends, post hinges engaging an end member of said frame, a fabric within said frame, a stretcher engaging said fabric at the post end of said gate, and a diagonal tension member connected at one end to said stretcher at a point substantially in line with one of said post hinges, and flexibly connected to said frame at the lower diagonal corner thereof, substantially as described.

4. In a gate, the combination of horizontal and vertical members joined at their ends to form a rectangular frame, a pair of hinges engaging a vertical member of said frame with capacity for vertical movement between the member and the hinges, whereby said frame may be bodily lifted a limited amount, and a combined support and pivot engaging the lower corner of said frame when said frame is in its lowermost position and disengaged from the frame when the frame is elevated, substantially as described.

5. In a gate, the combination of vertical and horizontal members united at their ends to form a rectangular frame, a vertical end member being circular in cross section throughout at least a portion of its length, a pair of hinges engaging the circular portion of said member and permitting combined rotation and vertical sliding movement of the frame member relative to the hinges, a bearing member at the lower corner of said frame, said bearing member acting as a pivot, support and thrust absorber when said frame is in its lowermost position and being disengaged from said frame when the frame is elevated, substantially as described.

6. In a gate, the combination of frame members hinged at their ends, means for maintaining said frame members in a plurality of adjusted positions, means permitting a bodily vertical movement of said gate, said means including a pair of hinges vertically spaced apart and adapted for sliding engagement with said frame and an auxiliary support for said frame, said support being located at the lower inner corner of the frame and engaging said frame only when said frame is in its lowermost position, substantially as described.

7. In a tilting gate, the combination of frame members hinged together, means for flexing said frame and securing the same in vertically adjusted position, hinges for securing said frame to a post, and a bracket having a vertical stud engaging a frame member beneath the lower end thereof and acting as a support and pivot, substantially as described.

8. In a gate adapted for swinging and tilting movement, the combination of frame members including two horizontal and two vertical members hinged at their ends and forming a normally rectangular frame, one of said vertical members having a socket at its lower end, a gate supporting post, and brackets securing said frame to said post, one of said brackets having a stud adapted to enter said socket and to act as a support and pivot for said frame, substantially as described.

THOMAS E. MULROYAN.

Witnesses:
W. A. KILMER,
J. M. SUTOY.